(12) United States Patent
Fitz et al.

(10) Patent No.: US 8,488,697 B2
(45) Date of Patent: Jul. 16, 2013

(54) UNIVERSAL TIMING RECOVERY CIRCUIT

(75) Inventors: Michael Paul Fitz, Los Angeles, CA (US); Scott Warren Enserink, Long Beach, CA (US); Isaak John Woldeit, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 82 days.

(21) Appl. No.: 13/102,530

(22) Filed: May 6, 2011

(65) Prior Publication Data
US 2012/0281795 A1 Nov. 8, 2012

(51) Int. Cl.
*H04K 1/10* (2006.01)

(52) U.S. Cl.
USPC ............................ 375/260; 375/316; 375/229

(58) Field of Classification Search
USPC ... 375/267, 326, 346, 260, 316, 229; 455/131
See application file for complete search history.

(56) References Cited

U.S. PATENT DOCUMENTS

| | | | |
|---|---|---|---|
| 4,061,978 A | | 12/1977 | Motley et al. |
| 4,458,356 A | | 7/1984 | Toy |
| 5,150,384 A | | 9/1992 | Cahill |
| 5,187,779 A | * | 2/1993 | Jeddeloh et al. ............ 710/315 |
| 5,282,228 A | | 1/1994 | Scott et al. |
| 5,425,057 A | | 6/1995 | Paff |
| 5,517,526 A | | 5/1996 | Caudron et al. |
| 5,692,014 A | | 11/1997 | Basham et al. |
| 5,870,443 A | | 2/1999 | Rahnema |
| 6,023,491 A | * | 2/2000 | Saka et al. ..................... 375/326 |
| 6,101,228 A | * | 8/2000 | Hebron et al. ................. 375/346 |
| 6,463,110 B1 | | 10/2002 | Rinderknecht et al. |
| 6,922,454 B2 | | 7/2005 | Ohta et al. |
| 6,937,671 B2 | | 8/2005 | Samarasooriya |

(Continued)

FOREIGN PATENT DOCUMENTS

EP 1 209 872 A2 5/2002

OTHER PUBLICATIONS

Wei-Ping Zhu; Yupeng Yan; Ahmad, M.O.; Swamy, M.N.S., "Feedforward symbol timing recovery technique using two samples per symbol," Circuits and Systems I: Regular Papers, IEEE Transactions on, vol. 52, No. 11, pp. 2490-2500, Nov. 2005.*

(Continued)

*Primary Examiner* — Daniel Washburn
*Assistant Examiner* — Fitwi Hailegiorgis
(74) *Attorney, Agent, or Firm* — John A. Miller; Miller IP Group, PLC

(57) ABSTRACT

A timing recovery system that provides a timing estimate between a transmitter clock and a receiver clock. The system includes a down-converter that converts a received intermediate frequency signal in the receiver and down-converts, using Fs/4 down-conversion, the received signal into baseband in-phase and quadrature phase signals. The baseband in-phase and quadrature phase signals are sent to a direct down-converter that frequency shifts the in-phase and quadrature phase. The frequency-shifted in-phase and quadrature phase baseband signals are then low-pass filtered in order to isolate the frequency components of interest, reduce noise, and remove zeros that are artifacts of the Fs/4 down-conversion. The signals are sent to a square-law non-linearity circuit that provides squaring non-linearity to generate non-linear in-phase and quadrature phase signals. The non-linear in-phase and quadrature phase signals are sent to a single-pole, low-pass post-filter circuit that generates the timing estimate.

12 Claims, 2 Drawing Sheets

U.S. PATENT DOCUMENTS

| | | |
|---|---|---|
| 7,116,742 B2 | 10/2006 | Agazzi |
| 2005/0271164 A1 | 12/2005 | Moulthrop et al. |
| 2008/0240221 A1 | 10/2008 | Morris |
| 2008/0298453 A1 | 12/2008 | Lerner et al. |
| 2009/0325518 A1* | 12/2009 | Mattisson et al. ............ 455/131 |

OTHER PUBLICATIONS

Seung Joon Lee, "A new non-data-aided feedforward symbol timing estimator using two samples per symbol," Communications Letters, IEEE, vol. 6, No. 5, pp. 205-207, May 2002.

* cited by examiner

UNIVERSAL TIMING RECOVERY CIRCUIT

BACKGROUND

1. Field of the Disclosure

This disclosure relates generally to a timing recovery circuit in a receiver for recovering clock timing from a received signal and, more particularly, to a digital timing recovery circuit in a receiver where the circuit is able to recover clock timing for both continuous phase modulated and linear stream modulated signals by providing signal down-conversion and filtering prior to a squaring non-linearity process.

2. Discussion of the Related Art

Digital signals can be wirelessly transmitted from a transmitter to a receiver where data and other information can be recovered. However, there is typically a discrepancy between the sample clock in the transmitter that transmitted the signal and the sample clock in the receiver that receives the signal that causes inter-symbol interference (ISI), and possible loss of data. Therefore, symbol timing recovery must be performed in front-end circuitry of the receiver to sufficiently recover the data in the received signal. For non-data-aided timing recovery, the timing information is encoded on a carrier frequency using symbols that are defined by changes in amplitude and phase of the transmitted signal. Timing recovery requires that the circuit identify when those changes in phases and amplitude occur in the signal.

The digital data is encoded on the carrier wave by different modulation schemes, including continuous phase modulation and linear stream modulation, well known to those skilled in the art. Traditional communications system use different timing recovery synchronization architectures for continuous phase modulation and linear stream modulation transmission protocols. The traditional timing recovery architecture that provided linear stream modulation typically included passing the received signal through a non-linearity circuit to generate a signal oscillating at the clock frequency. This signal is filtered and in-phase and quadrature phase (I/Q) down-converted to produce a time estimate.

One known down-converting methodology is referred to in the art as Fs/4 down-conversion that down-converts a received signal to an intermediate frequency (IF) to produce both the in-phase and quadrature phase components of the signal. However, known timing recovery circuits in receiver front-ends are typically unable to provide Fs/4 down-conversion for both continuous phase modulation and linear stream modulation.

DETAILED DESCRIPTION OF THE EMBODIMENTS

The following discussion of the embodiments of the disclosure directed to a timing recovery circuit is merely exemplary in nature, and is in no way intended to limit the invention or its applications or uses.

Figure 1:
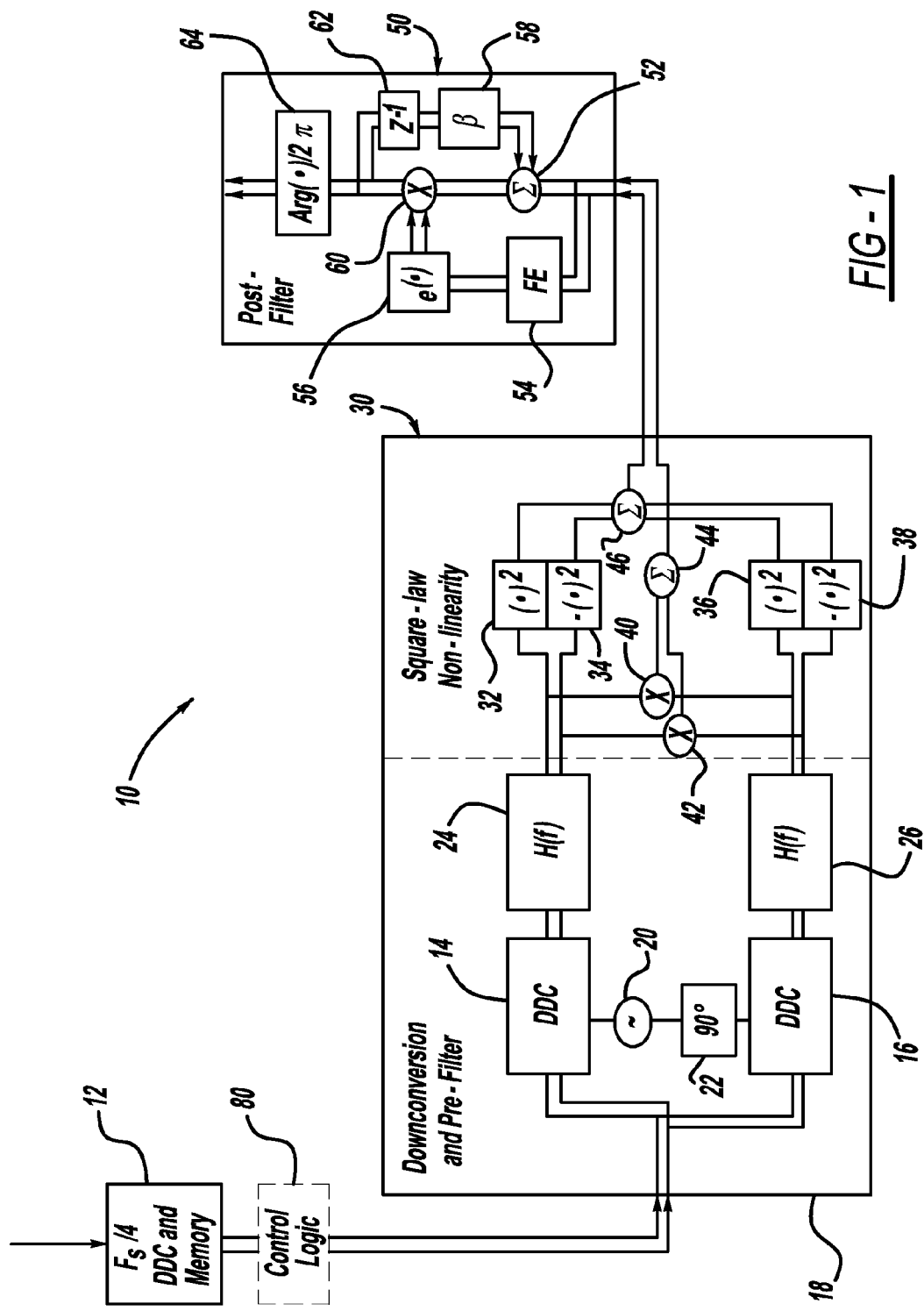
FIG. 1 is a schematic block diagram of a timing recovery circuit.

FIG. 1 is a schematic block diagram of a timing recovery circuit 10 that is able to provide non-data-aided digital timing recovery of Fs/4 down-converted signals for both continuous phase modulated and linear stream modulated signals. The timing recovery circuit 10 would be part of a receiver front-end that receives the signals transmitted from a suitable transmitter (not shown). The signal is received by a suitable antenna (not shown) and pre-processing of the signals is performed, including analog-to-digital conversion, as would be well understood to those skilled in the art. The digital pre-processed signals are then sent to a digital down-converter 12 that provides Fs/4 digital down-conversion to produce both in-phase and quadrature phase components of the received signal that are 90° apart in phase at an intermediate frequency (IF) in a manner that is well understood to those skilled in the art. Although the circuit 10 provides timing recovery for Fs/4 down-converted signals in this embodiment, this is merely illustrative in that other types of digitally down-converted signals will be applicable for timing recovery in the circuit 10.

The output of the digital down-converter 12 includes in-phase and quadrature phase Fs/4 IF signals that are offset in time by one quarter of a sampling period. Both the in-phase signals and the quadrature phase signals are sent to an in-phase direct down-converter (DDC) 14 and a quadrature phase DDC 16 in a down-conversion and pre-filtering sub-circuit 18 of the circuit 10 that down-convert the in-phase and quadrature phase signals from the intermediate frequency to a baseband frequency. The IF down-conversion performed by the down-converter 12 provides a signal having a certain bandwidth, where the timing information is provided at the edge of the signal's bandwidth. By further down-converting the signal to the baseband frequency, the middle portion between the edges of the signal's bandwidth can be eliminated so that basically only the edge portions of the signal remains.

The DDCs 14 and 16 multiply the in-phase and quadrature phase signals by a sinusoidal signal from an oscillator 20, where the sinusoidal signal is offset by 90° using a delay 22 for the quadrature phase DDC 16. In this embodiment, the oscillator 20 has a frequency of $f_c = \frac{1}{2}T_{sym}$, where $T_{sym}$ is the symbol time. The DDC 14 multiplies the in-phase signal and the quadrature phase signal by a cosine part of the sinusoidal signal from the oscillator 20 and the DDC 16 multiplies the in-phase signal and the quadrature phase signal by a sine part of the sinusoidal signal from the oscillator 20 by shifting it 90° via the delay 22.

The cosine in-phase and quadrature phase down-converted signals from the DDC 14 are sent to an accumulator filter 24 and the sine in-phase and quadrature phase down-converted signals from the DDC 16 are sent to an accumulation filter 26 that remove interstitial zero terms from the Fs/4 down-conversion so that extra zeros in the signal can be removed. Because the signals are down-converted prior to filtering, simple low-pass filtering is performed on the baseband signals to provide signal smoothing and reduce noise. This filtering does not need to consider that the signals are Fs/4 quadrature phase signals.

The filtered cosine in-phase and quadrature phase signals and the filtered sine in-phase and quadrature phase signals are then sent to a square-law non-linearity processor 30 that performs squaring non-linearity that accentuates the timing information contained in the signals. The filtered cosine in-phase signal is squared at box 32, the filtered cosine quadrature phase signal is squared at box 34, the filtered sine in-phase signal is squared at box 36 and the filtered sine quadrature phase signal is squared at box 38. Additionally, the cosine and sine in-phase signals are multiplied by a multiplier 40 and the cosine and sine quadrature phase signals are multiplied by a multiplier 42, and the two multiplied signals are added by a summer 44. Also, all of the squared signals from the boxes 32, 34, 36 and 38 are added by a summer 46 to complete the square-law non-linearity process and provide non-linear in-phase and quadrature phase signals.

Because the down-conversion to baseband is performed prior to the square-law non-linearity process, the frequency of the down-conversion can be reduced by half. Further, because the down-conversion to baseband and the filtering is performed in the sub-circuit 18 prior to the square-law non-linearity process in the processor 30, the circuit 10 can provide timing recovery for Fs/4 down-converted signals for both continuous phase modulation and linear stream modulation.

The non-linear in-phase signal and the quadrature phase signal from the square-law non-linearity processor 30 are then sent to a single-pole, low-pass post-filter 50 that uses a frequency de-rotation filter that provides low complexity, feed-forward recovery of the timing estimates.

The symbol timing information contained in the phase relationship between the non-linear in-phase and quadrature phase signals is obscured by noise that makes the exact position of the symbol unknown. To correct for this noise and provide signal smoothing, the current in-phase and quadrature phase signals are added to a weighted sum of previous values by a summer 52. The previous sum of the in-phase and quadrature phase signals is provided by a delay box 62. The value β at box 58 provides a weighting factor between the new value and the previous values. The value β is selected to determine how much the previous summation, and its associated symbol position information, will be weighted to determine a new summation, and thus a new symbol position, where the higher the value, the more weight is given to the previous position. Thus, the value β provides the amount of filtering performed by the low-pass filter. The summation at the summer 52 provides a one-pole, low-pass filter that provides signal smoothing for the new in-phase and quadrature phase values being received to remove noise and identify the proper location of the symbol.

The symbols may also be rotating from one time period to the next time period, due to a frequency offset. To correct this offset, a frequency estimation (FE) of the new symbols is provided at box 54 to determine how much rotation has occurred from one sample point to the next sample point. The frequency offset is identified at box 56, and is used by a complex-exponential multiplier 60 to compensate for the frequency offset.

An arctangent of the in-phase and quadrature phase signals is taken at box 64 and divided by $2\pi$ to give the actual output time estimation from the circuit 10. The angle between the in-phase value and the quadrature phase value provides the timing estimate, which is given by the arctangent of the angle. The division by $2\pi$ causes the timing estimate to be in fractions of a symbol period as opposed to radians.

As discussed above, timing recovery in digital receivers allows the receiver clock to know when to look at each symbol in the received signal to look for changes in the signal. Timing recovery synchronizes the receiver clock to those changes as generated in the transmitter. The timing information that is used to provide timing recovery, such as by the circuit 10, is contained in continuous samples or data points of the received signal. Therefore, known timing recovery circuits typically looked at every sample within an observation period to provide the timing estimate. As the sample clock speed increases for high data rate systems, the timing recovery circuit must operate at a very high processing rate to look at every sample. Thus, timing recovery systems become very complex as the data rate of the system increases.

It has been observed that although the symbol frequency of the system may increase for high data rate systems, the actual timing information in those high frequency signals changes relatively slowly. Thus, high data rate signal processing is typically not needed to provide accurate timing estimates in high data rate modem systems. In other words, the phase offset between the transmitter clock and the receiver clock that defines the mismatch in the timing changes relatively slowly as compared to the frequency of how often data is received by the receiver. Timing estimation techniques that require less over-sampling have been proposed, but do not reduce the frequency of the timing estimation circuit below the RF sampling rate.

The present disclosure also proposes a method for generating timing estimates over an observation period that uses a continuous sub-set or a snapshot of the full set of samples in the observation period. The timing estimation algorithm processes the snapshot over the full time of the observation period, thus allowing the timing recovery circuit to operate at a fraction of the operating frequency of the receiver while still retaining the continuous samples that contain the timing information.

As discussed above, processing timing estimates with minimal delay at the sample rate is costly and complex at high sample rates. Using a continuous sub-set of these samples allows the timing estimation circuit to operate at a lower frequency, and thus reduces the cost and complexity of the design. Advantages of this proposed approach include obtaining a continuous snapshot that generates a waveform with the desired timing information and making this snapshot have a small duty cycle that reduces the processing complexity needed to produce the timing estimates and matches the process complexity more closely to the tracking bandwidth needed for timing recovery. The timing estimation can still be performed at a full data rate.

Figure 2:
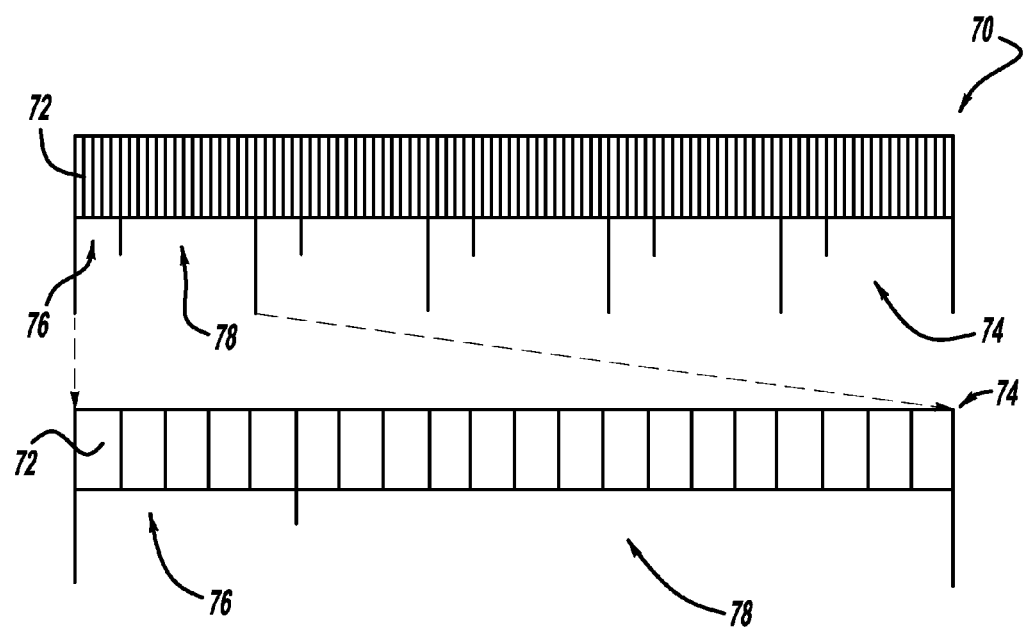
FIG. 2 is an illustration of digital data samples received by the circuit shown in FIG. 1 where a portion of the data samples is used for timing recovery.

FIG. 2 is a representation of a data stream 70 that illustrates the timing recovery process described above. The data stream 70 includes a series of consecutive data points or samples 72. A certain number of the consecutive samples 72 are defined as an observation period 74 over which timing estimations between the transmitter and the receiver are determined, where the observation periods 74 are also continuous. Each observation period 74 is separated into a first portion 76 including a plurality of consecutive samples 72 that defines the snapshot of samples used for timing recovery and a second portion 78 including a plurality of consecutive samples 72 that are not used for timing recovery. As is apparent, the non-timing recovery portion 78 includes many more of the samples 72 than the timing recovery portion 76 in the observation period 74, thus allowing the timing recovery circuit to operate much slower than the actual data rate.

The specific number of the samples 72 necessary for timing recovery would be application specific, where more of the samples 72 would be required as noise in the system increased. Although the first portion 76 that includes the sample 72 that are used for timing recovery are shown to come from a beginning of the observation period 74, this is by way of a non-limiting example in that the sub-set of the consecutive samples 72 that are used for timing recovery in the observation period 74 can come from any location in the observation period 74 as long as the samples are continuous. Further, the timing recovery circuit that looks at the first portion 76 of the samples 72 used for timing recovery would reduce the sampling clock rate necessary to process the number of samples 72 over the time provided by the observation period 74. In other words, the amount of time needed for all of the samples 72 in the observation period 74 at the higher data rate is the amount of time used to process the samples 72 in the first portion 76, so that the time provided by the observation period 74 and the number of samples in the first portion 76 determines the clock rate for timing recovery.

The process for providing signal timing recovery using a continuous sub-set of samples as discussed above with reference to FIG. 2 can be used in the circuit 10, although the circuit 10 is also designed to operate at the faster data rate to sample all of the data points. If the circuit 10 does use the sub-set sample portion for timing recovery, then a control logic 80 can be provided before the down-conversion and pre-filtering at the sub-circuit 18 that receives the in-phase and quadrature phase signals from the down-converter 12. The control logic 80 outputs the in-phase and quadrature phase sample signals at a slower clock rate where only the samples 72 in the first portion 76 of the observation period 74 are passed through the circuit 10. Therefore, as discussed above, the sampling clock rate of the circuit 10 would depend on the observation period time at the higher data rate and the number of samples in the first portion 76.

The foregoing discussion discloses and describes merely exemplary embodiments of the present disclosure. One skilled in the art will readily recognize from such discussion, and from the accompanying drawings and claims, that various changes, modifications and variations can be made therein without departing from the spirit and scope of the invention as defined in the following claims.

What is claimed is:

1. A timing recovery system that provides a timing estimate between a transmitter clock and a receiver clock, said system comprising:
    a first direct down-converter receiving in-phase and quadrature phase signals and down-converting the in-phase and quadrature phase signals to first down-converted in-phase and quadrature phase baseband signals;
    a second direct down-converter receiving in-phase and quadrature phase signals and down-converting the in-phase and quadrature phase signals to second in-phase and quadrature phase baseband signals, where the first in-phase and quadrature phase baseband signals and the second in-phase and quadrature phase baseband signals are 90° apart in phase;
    a first filter for filtering the first in-phase and quadrature phase baseband signals to remove zero terms;
    a second filter for filtering the second in-phase and quadrature phase baseband signals to remove zero terms;
    a square-law non-linearity circuit that receives the filtered first in-phase and quadrature phase baseband signals and the filtered second in-phase and quadrature phase baseband signals and providing squaring non-linearity between the first and second baseband signals to generate non-linear in-phase and quadrature phase signals, wherein the square-law non-linearity circuit squares the first in-phase baseband signal, squares the first quadrature phase baseband signal, squares the second in-phase baseband signal and squares the second quadrature phase baseband signal, said square-law non-linearity circuit further adding the squared signals to generate the non-linear in-phase signal, and wherein the square-law non-linearity circuit multiplies the first and second in-phase baseband signals and multiplies the first and second quadrature phase baseband signals, and then adds the multiplied signals to generate the non-linear quadrature phase signal; and
    a post-filter circuit receiving the non-linear in-phase and quadrature phase signals and producing the timing estimate.

2. The system according to claim 1 wherein the input in-phase and quadrature phase signals are Fs/4 down-converted in-phase and quadrature phase signals.

3. The system according to claim 1 wherein the first and second filters are low-pass filters.

4. The system according to claim 1 wherein the post-filter circuit is a single-pole, low-pass post-filter circuit.

5. The system according to claim 4 wherein the post-filter circuit provides a weighting value to previous non-linear in-phase and quadrature phase signals and then adds the weighted previous non-linear in-phase and quadrature phase signals to a new non-linear in-phase and quadrature-phase signals to remove noise.

6. The system according to claim 4 wherein the post-filter circuit provides a frequency estimation of the non-linear in-phase and quadrature phase signals to remove a frequency offset of the non-linear in-phase and quadrature phase signals.

7. The system according to claim 4 wherein the post-filter circuit provides an arctangent of the non-linear in-phase and quadrature phase signals and divides the arctangent by $2\pi$ to provide the timing estimate.

8. A timing recovery system that provides a timing estimate between a transmitter clock and a receiver clock, said system comprising:
    an intermediate frequency down-converter receiving a received signal and providing Fs/4 down-converted intermediate frequency in-phase and quadrature-phase signals, where the in-phase and quadrature phase signals are 90° apart in phase;
    a first direct down-converter receiving the intermediate frequency in-phase and quadrature phase signals and down-converting the in-phase and quadrature phase signals to first down-converted in-phase and quadrature phase baseband signals;
    a second direct down-converter receiving the intermediate frequency in-phase and quadrature phase signals and down-converting the in-phase and quadrature phase signals to second in-phase and quadrature phase baseband signals;
    a first low-pass filter for filtering the first in-phase and quadrature phase baseband signals to remove zero terms;
    a second low-pass filter for filtering the second in-phase and quadrature phase baseband signals to remove zero terms;
    a square-law non-linearity circuit that receives the filtered first in-phase and quadrature phase baseband signals and the filtered second in-phase and quadrature phase baseband signals and provides squaring non-linearity between the first and second baseband signals to generate non-linear in-phase and quadrature phase signals, wherein the square-law non-linearity circuit squares the first in-phase baseband signal, squares the first quadrature phase baseband signal, squares the second in-phase baseband signal and squares the second quadrature phase baseband signal, said square-law non-linearity circuit further adding the squared signals to generate the non-linear in-phase signal, and wherein the square-law non-linearity circuit multiplies the first and second in-phase baseband signals and multiplies the first and second quadrature phase baseband signals, and then adds the multiplied signals to generate the non-linear quadrature phase signal; and
    a post-filter circuit receiving the non-linear in-phase and quadrature phase signals and producing the timing estimate.

9. The system according to claim 8 wherein the post-filter circuit is a single-pole, low-pass post-filter circuit.

10. The system according to claim 9 wherein the post-filter circuit provides a weighting value to a previous non-linear in-phase and quadrature phase signals and then adds the weighted previous non-linear in-phase and quadrature phase signals to a new non-linear in-phase and quadrature-phase signals to remove noise.

11. The system according to claim 9 wherein the post-filter circuit provides a frequency estimation of the non-linear in-phase and quadrature phase signals to remove a frequency offset of the non-linear in-phase and quadrature phase signals.

12. The system according to claim 9 wherein the post-filter circuit provides an arctangent of the non-linear in-phase and quadrature phase signals and divides the arctangent by $2\pi$ to provide the timing estimate.

* * * * *